United States Patent [19]
DeFranco et al.

[11] Patent Number: 5,475,214
[45] Date of Patent: Dec. 12, 1995

[54] MUSICAL SOUND EFFECTS CONTROLLER HAVING A RADIATED EMISSION SPACE

[75] Inventors: Vincent DeFranco; Oded Zur; Assaf Gurner, all of Los Angeles; Romeo Balina, La Cresenta; Douglas H. Schiller, Los Angeles; Reza Miremadi, Agoura, all of Calif.

[73] Assignee: Interactive Light, Inc., Santa Monica, Calif.

[21] Appl. No.: 376,113

[22] Filed: Jan. 20, 1995

Related U.S. Application Data

[63] Continuation-in-part of Ser. No. 177,904, Jan. 6, 1994, Pat. No. 5,414,256, which is a continuation-in-part of Ser. No. 1,058, Jan. 6, 1993, Pat. No. 5,236,012, which is a continuation-in-part of Ser. No. 776,669, Oct. 15, 1991, abandoned.

[51] Int. Cl.$^6$ ..................................................... G01V 9/04
[52] U.S. Cl. .............................. 250/221; 84/724; 381/61
[58] Field of Search .................... 250/221, 222.1; 84/724, 312 P, 737, 746; 381/61–64, 118; 340/825.44, 825.49, 825.54; 341/27, 29, 31

[56] References Cited

U.S. PATENT DOCUMENTS

| | | | |
|---|---|---|---|
| 3,749,810 | 7/1973 | Dow | 84/1.24 |
| 3,808,344 | 4/1974 | Ippolito et al. | 84/1.01 |
| 3,812,278 | 5/1974 | Aker | 84/1.25 |
| 3,813,473 | 5/1974 | Terymenko | 84/1.16 |
| 3,860,755 | 1/1975 | Kimbell et al. | 181/155 |
| 3,956,960 | 5/1976 | Deutsch | 84/1.19 |
| 3,973,461 | 8/1976 | Jahns | 84/1.24 |
| 4,016,495 | 4/1977 | Machanian | 84/1.19 |
| 4,028,977 | 6/1977 | Ryeczek | 84/724 |
| 4,030,397 | 6/1977 | Nelson | 84/1.22 |
| 4,055,103 | 10/1977 | Machanian | 84/1.01 |
| 4,079,334 | 3/1978 | Hamilton | 84/1.24 |
| 4,227,049 | 10/1980 | Thomson et al. | 84/1.24 |
| 4,235,144 | 11/1980 | Lubow et al. | 84/1.16 |
| 4,244,261 | 1/1981 | Adachi | 84/1.24 |
| 4,273,022 | 6/1981 | Bell | 84/400 |
| 4,287,803 | 9/1981 | Zema | 84/1.24 |
| 4,308,779 | 1/1982 | Suzuki et al. | 84/1.26 |
| 4,326,442 | 4/1982 | Suzuki | 84/1.19 |
| 4,438,674 | 3/1984 | Lawson | 84/1.24 |
| 4,445,415 | 5/1984 | Izquierdo | 84/177 |
| 4,644,289 | 2/1987 | Kennedy et al. | 84/1.11 |
| 4,672,671 | 6/1987 | Kennedy | 381/61 |
| 4,701,957 | 10/1987 | Smith | 381/61 |
| 4,757,737 | 7/1988 | Conti | 84/1.12 |
| 5,031,089 | 7/1991 | Liu et al. | 364/200 |
| 5,214,232 | 5/1993 | Iijima et al. | 84/724 |
| 5,248,843 | 9/1993 | Billings | 84/609 |
| 5,300,730 | 4/1994 | Ekhaus | 84/734 |

Primary Examiner—Edward P. Westin
Assistant Examiner—Que T. Le
Attorney, Agent, or Firm—Kirschstein, et al.

[57] ABSTRACT

Movement of a musical instrument in space is employed to modulate its sound output. An electro-optical controller is used to detect the elevation of the instrument relative to the floor and, in turn, a control signal for modulating the sound output is generated.

20 Claims, 12 Drawing Sheets

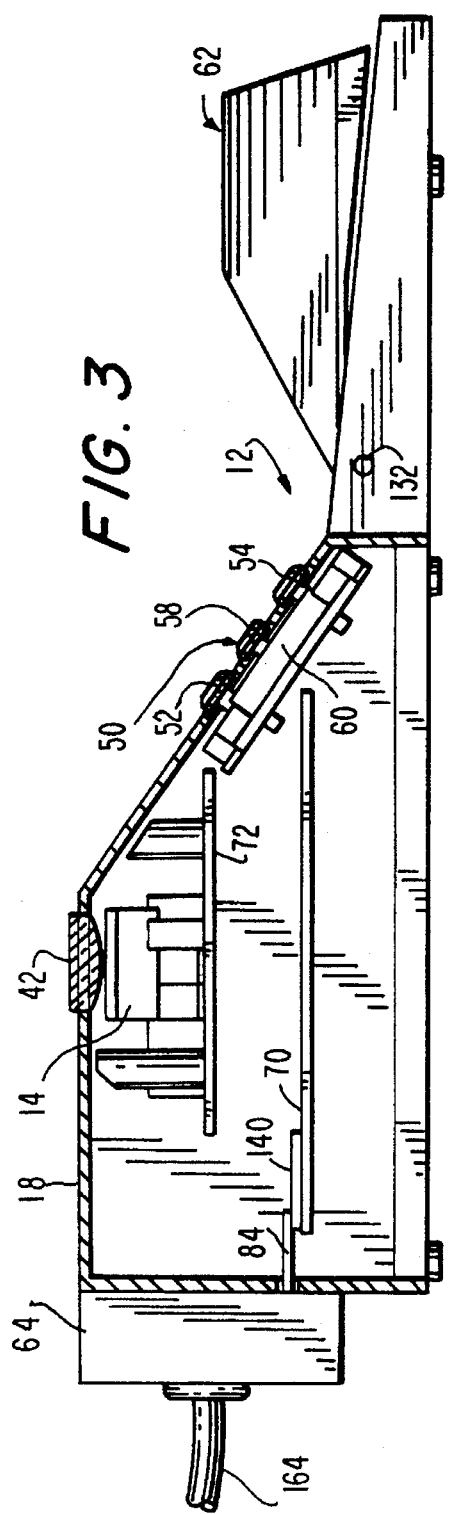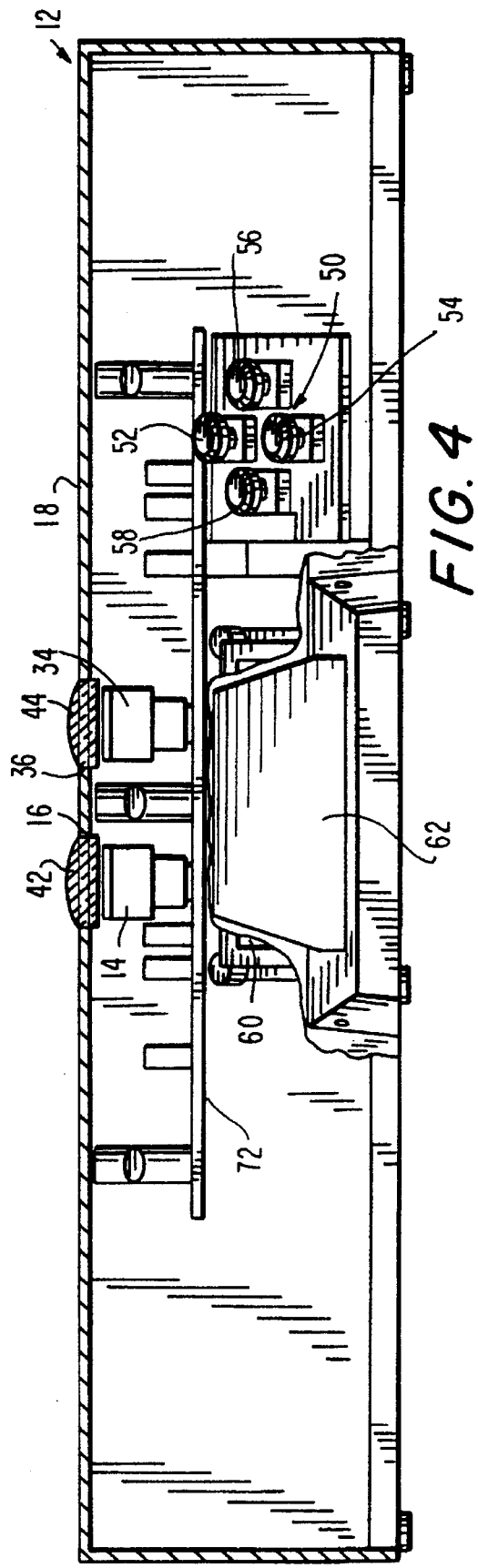

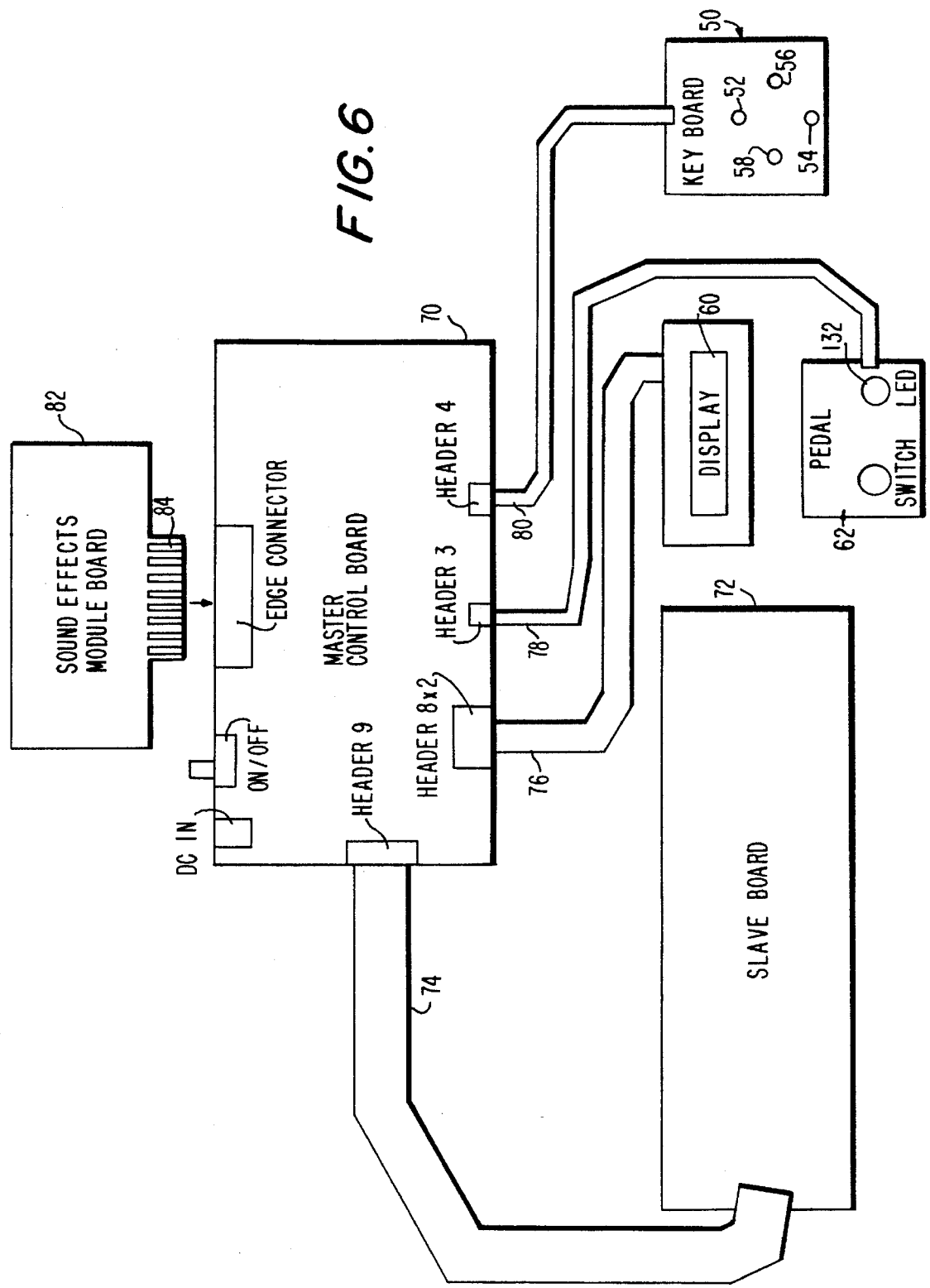

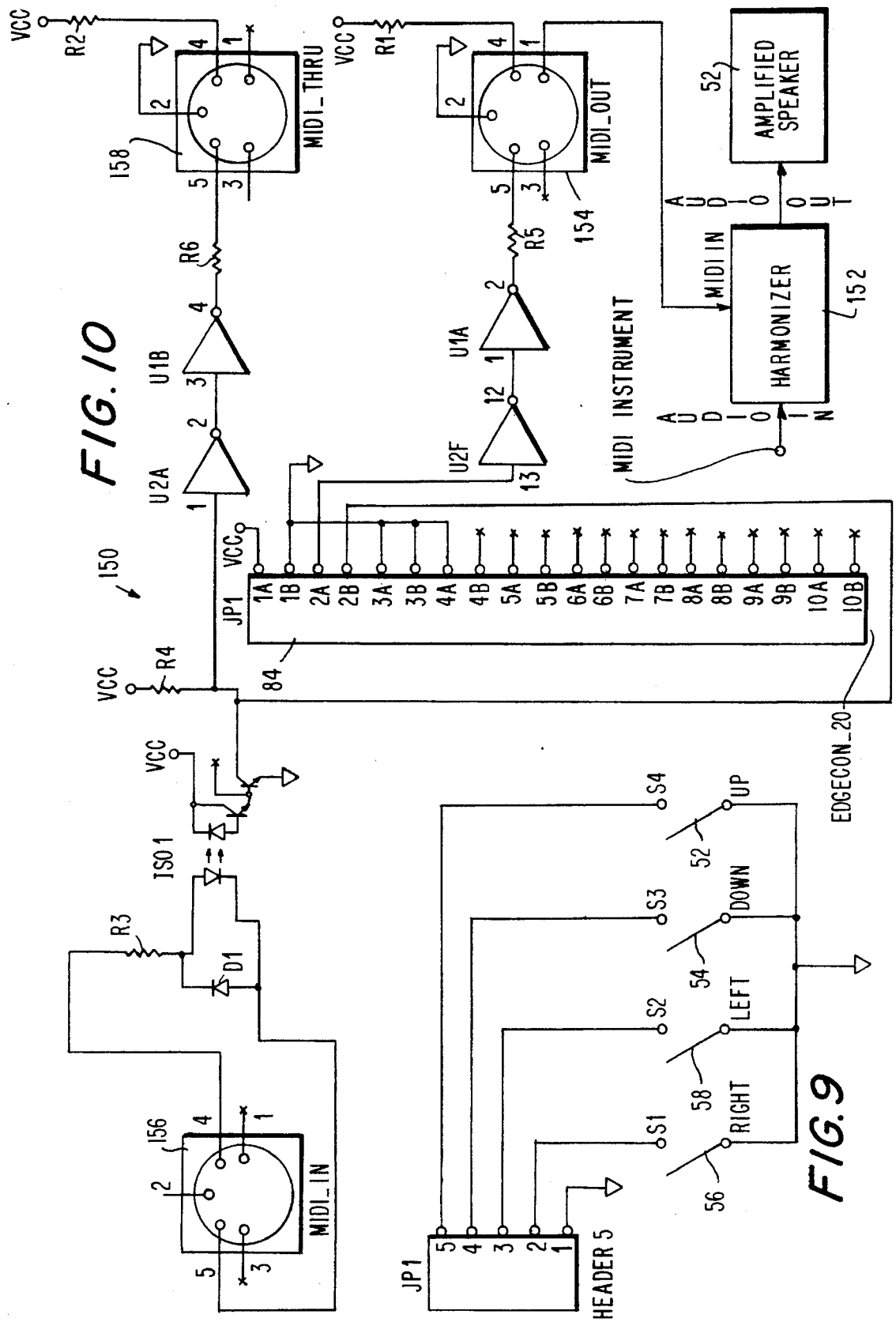

MUSICAL SOUND EFFECTS CONTROLLER HAVING A RADIATED EMISSION SPACE

CROSS REFERENCE TO RELATED APPLICATIONS

This application is a continuation-in-part of U.S. patent application Ser. No. 08/177,904, filed Jan. 6, 1994, now U.S. Pat. No. 5,414,256, which, in turn, is a continuation-in-part of U.S. patent application Ser. No. 08/001,058, filed Jan. 6, 1993, now U.S. Pat. No. 5,236,012, which, in turn, is a continuation-in-part of U.S. patent application Ser. No. 07/776,669, filed Oct. 15, 1991, now abandoned.

BACKGROUND OF THE INVENTION

1. Field of the Invention

This invention generally relates to an arrangement for, and a method of, generating musical sound effects and, more particularly, to controlling musical sound effects by moving a sound-generating instrument in space.

2. Description of the Related Art

It is known to convert the sound generated by a musical instrument into an electrical signal, and to electronically process the signal in such electronic instruments as amplifiers, modulators, harmonizers, synthesizers and the like, in order to create a desired musical sound effect. For example, in the case of an electronic guitar, so-called "wah-wah" and "pitch bender" controllers are used to control the sound envelope.

Although generally satisfactory for their intended use, such guitar controllers are typically operated by depressing foot pedals with one's foot, or by manipulating control buttons by hand. Such foot-or hand-operated controls are often not the most convenient to operate. During the course of a musical performance, it is often disruptive and aesthetically awkward for an audience to have to wait while a performer is manipulating an instrument controller, especially when such manipulation is often repeated during the performance.

It is also known in the musical field from U.S. Pat. No. 5,045,687 to translate bodily movements directly into musical tones. Typically, a light beam is produced in space and, thereupon, a portion of one's body, typically the hands, is positioned in the light beam in order to reflect light from the hands. This reflected light is detected and translated into an electrical signal which, in turn, is processed into a musical tone. Such tone generators are highly satisfactory for their intended use, typically by dancers or like performance artists, but are not useful to performers whose hands are already occupied with the playing of a musical instrument.

SUMMARY OF THE INVENTION

Objects of the Invention

It is a general object of this invention to control musical sound effects by moving a sound-generating instrument in space.

Another object of this invention is to control musical sound effects during playing the instrument without requiting the player to stop playing and directly manipulate foot and/or hand controls.

Still another object of this invention is to easily change musical sound effects in the field.

An additional object of this invention is to provide a musical sound effects controller whose operation is virtually imperceptible to an audience.

Yet another object of this invention is to provide a player of an instrument more freedom of movement and of creative expression.

Features of the Invention

In keeping with these objects and others which will become apparent hereinafter, one feature of this invention resides, briefly stated, in an arrangement for, and a method of, generating modulated sound. Transmitter means are supported by a support, and are operative for transmitting radiation therefrom into an emission space. Means are provided for generating sound, including an inanimate sound-generating instrument. The instrument is movable relative to, and at a distance from, the support within the emission space, in order to direct radiation toward the support with a variable intensity proportional to the distance of the instrument relative to the support. Sensor means are supported by the support, and are operative for sensing the radiation directed by the instrument, and for generating a control signal indicative of this radiation intensity. Control means are operatively connected to the sensor means and the sound generating means, and are operative for modulating the sound with the control signal to generate a modulated sound.

In the preferred embodiment, the transmitter means includes an emitter for emitting a light beam, e.g., an infrared light beam, and the sensor means includes an infrared detector for detecting the reflected light. At least one of the transmitter means and the sensor means includes, and preferably both include, means for shaping at least one of the spaces to have a non-circular cross-section. Such shaping means advantageously includes an optical train for shaping each space to have a generally flat, screen-like volume whose cross-sectional thickness is less than its cross-sectional width.

In accordance with this invention, reflector means, preferably a retro-reflective strip, are supported by the instrument for joint movement therewith. The strip is operative for reflecting the transmitted light beam toward the detector. Advantageously, the strip is adhered along a neck of a guitar in a position facing the support.

Another feature of this invention resides in providing means for setting minimum and maximum distances at which the instrument is spaced from the support, and for modulating the sound only when the instrument is located between such minimum and maximum distances. A foot-operated switch may be provided on the support to set such distances. A display may also be provided on the support for displaying menus, settings and related information.

The control means further includes means for establishing a multitude of levels between such minimum and maximum distances. The control means associates the control signal with one of such levels, and is operative for generating a modulated sound corresponding to said one level. The control means generates a different modulated sound for each level.

It is further advantageous if the control means includes means for recognizing different directions of movement of the instrument, and for differently modulating the sound upon such direction recognition. Thus, one sound or musical effect is generated when the instrument is moved up, or down, or toward the right, or toward the left, or any combination of such directions.

Yet another feature of this invention resides in providing separate modules each of which is removably and selectively connected to the support. Such modules differently modulate the sound upon their connection to the support. For example, one module includes an analog signal processor, whereas another module includes a digital signal processor.

In accordance with this invention, it is merely necessary to move a sound-generating instrument within the emission and sensing spaces in order to generate different musical sound effects. The player no longer uses his or her hands to directly manipulate controls during playing of the instrument and, of course, no longer needs to stop playing to effect such control. The various musical sound effects can be controlled in a manner which is virtually imperceptible to an audience.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a part sectional, part elevational view taken on line 3—3 of FIG. 2;

FIG. 4 is a part sectional, part elevational view taken on line 4—4 of FIG. 2;

FIG. 5 is an enlarged, sectional view taken on line 5—5 of FIG. 1;

FIG. 5a is an enlarged perspective view of a shaping component for use with the FIG. 1 arrangement;

FIG. 6 is an electrical circuit board layout of principal components of the arrangement of FIG. 1;

FIG. 9 is an electrical circuit schematic of the keyboard component of FIG. 6;

FIG. 10 is an electrical circuit schematic of one embodiment of a sound effects digital module component of FIG. 6;

DETAILED DESCRIPTION OF THE PREFERRED EMBODIMENT

Figure 1:
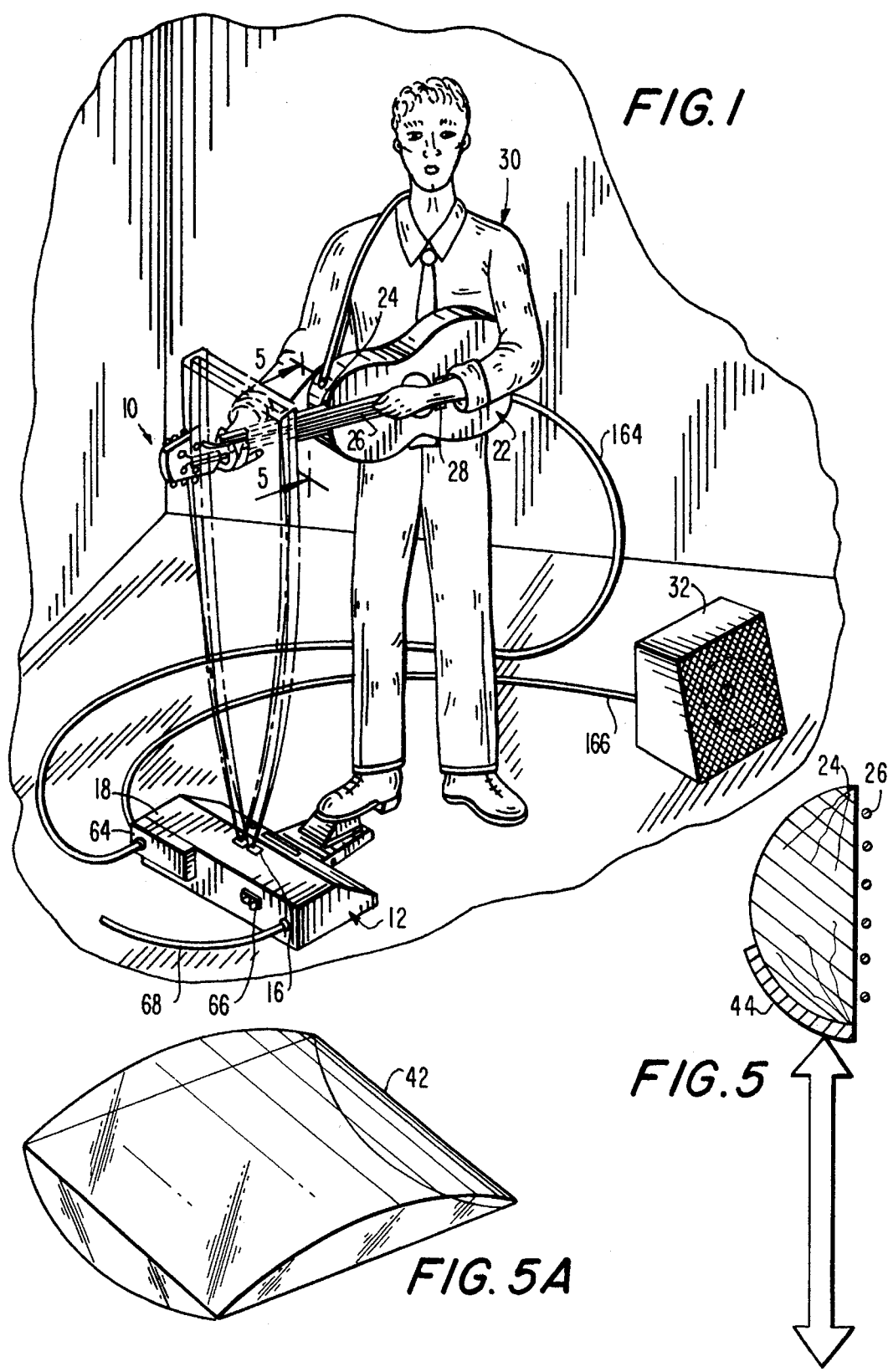
FIG. 1 is a perspective view of an arrangement for generating modulated sound in accordance with the method of this invention.

Referring now to the drawings, reference numeral 10 generally identifies an arrangement for generating modulated sound in accordance with the method of this invention. Arrangement 10 includes a support or housing 12 supported on the ground or floor. As shown in FIG. 4, a transmitter 14 is mounted within the housing 12 and is operative, as described below, for transmitting radiation therefrom to an exit port 16 in a top wall 18 of the housing into an emission space 20 (see FIG. 2) extending upwardly from the floor away from the housing toward the ceiling. An inanimate, sound-generating instrument 22, for example, an electric guitar having a long fretted neck 24 and a plurality of strings 26 (see FIG. 5) plucked with a pick or with the fingers, is held in the arms of a human player 30. The electric guitar has an electric pickup 28 that converts the vibration of the strings into electrical acoustic signals which are then operatively conducted to an amplified speaker 32. The electric guitar itself, as described so far, is entirely conventional and requires no further description.

As also shown in FIG. 4, a receiver 34 is mounted within the housing 12 and is operative, as described below, for receiving radiation through an entrance port 36 in the top wall 18 of the housing over a field of view or sensing space 40. The ports 16, 36 are closely adjacent each other on the top wall 18 to ensure that the emission space 20 and the sensing space 40 substantially overlap each other (see FIG. 2) in a vertical direction perpendicular to the floor.

In the preferred embodiment, the transmitter is an infrared light transmitting diode for generating an infrared light beam; and the receiver is an infrared receiving photodiode for detecting infrared light impinging thereon. For better system control, optical elements (see, FIG. 5a) are used to shape the emission and sensing spaces. Thus, the transmitting diode 14 acts as a point source and emits a generally conical light beam. Optical element 42 includes a first cylindrical focusing lens for focusing the beam, as well as a second cylindrical lens, at right angles to and integral with the first lens, for spreading the focused light beam in a transverse direction. The resultant emission space is a generally parabolic, generally flat, screen-like beam having a cross-sectional thickness T much smaller than its cross-sectional width W (see FIG. 2). Similarly, the receiving diode 34 has a generally conical field of view. Optical element 44 includes a first generally cylindrical focusing lens for focusing the field of view onto the receiving diode, as well as a second cylindrical lens, at right angles to and integral with, the first lens, for spreading the field of view over a transverse direction. The resultant sensing space is also a generally parabolic, generally flat, screen-like beam whose thickness is much smaller than its width. Both screen-like shaped spaces overlap each other in the cross-hatched region shown in FIG. 2.

As shown in FIG. 1, when the neck 24 is positioned in and perpendicularly to the overlapping region of the spaces, the neck reflects and directs the light beam toward the receiving diode 34 with a variable intensity. For better system control, a reflector, such as a retro-reflective strip 44 (see FIG. 5) is adhered to, and lengthwise along, the underside of the neck 24 facing the housing 12. The preferred strip is available from the 3-M Corporation as Model No. 680-10. The intensity is proportional to many factors, one of which is the distance of the strip 44 relative to the housing. The further away the strip is from the housing, the smaller the intensity, and vice-versa. As described below, the receiving diode 24 generates an electrical control signal corresponding to the variable intensity of light reflected by the neck. This control signal is processed by a controller which, in turn, is operative for modulating the sound with the control signal to generate a modulated sound effect. Musical sound effects achieved by the present invention include wah-wah sounds, pitch bending sounds, volume increase/decrease sounds, treble increase/decrease sounds, bass increase/decrease sounds, total MIDI sounds, etc.

Figure 2:
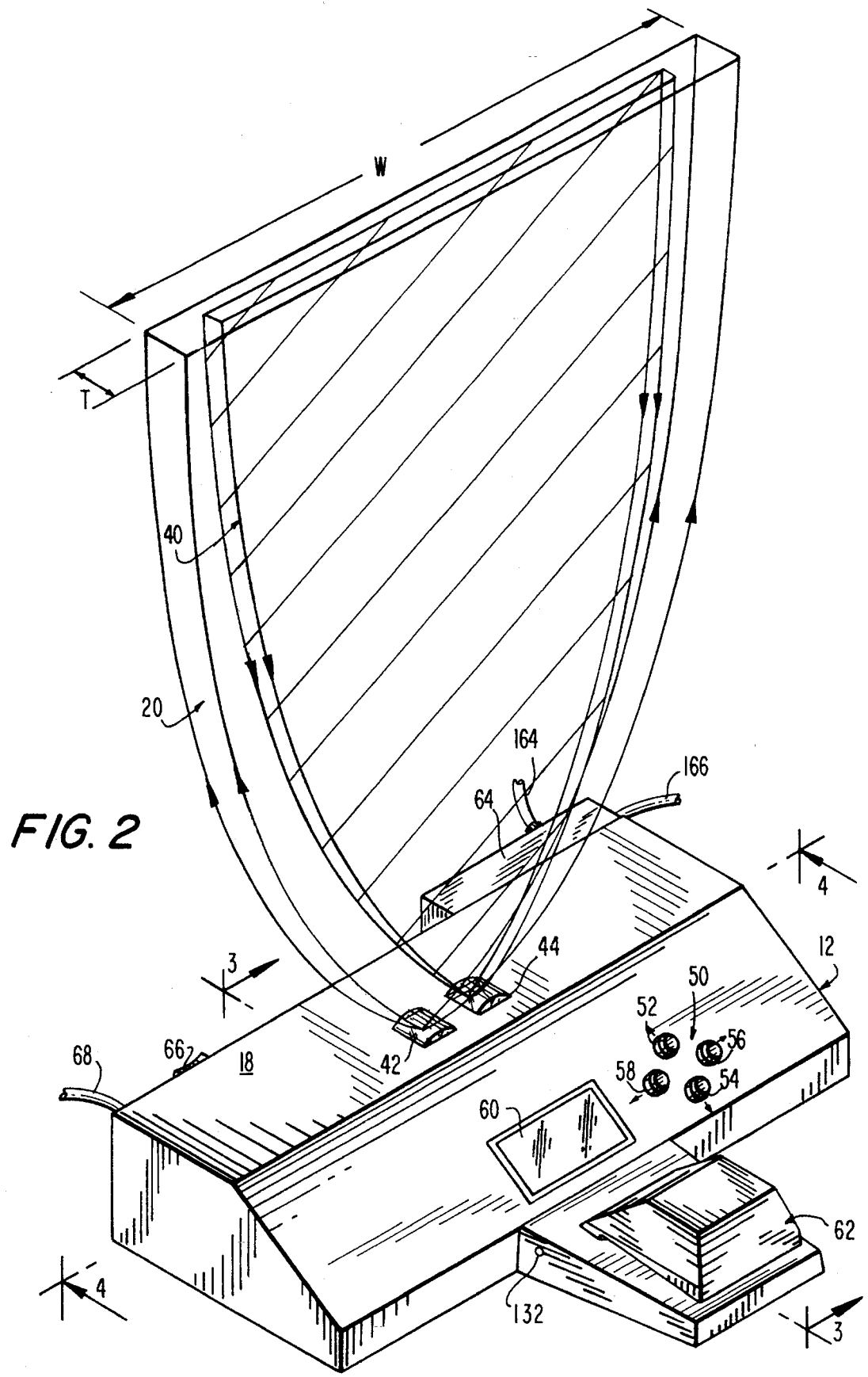
FIG. 2 is a perspective view of the arrangement of FIG. 1 on an enlarged scale.

As best shown in FIG. 2, a keyboard 50 having an up key 52, a down key 54, a right key 56 and a left key 58, is also mounted on the housing. The keys are advantageously foot-depressible switches. A display 60, preferably a back-lit LCD display, is mounted alongside the keyboard 50 on a front panel. A foot pedal 62 is centrally located on, and electro-mechanically connected to, the housing. A sound effects module 64 is rearwardly connected behind the housing 12. A power off-on switch 66 is mounted on a rear wall of the housing. Power cable 68 supplies DC power for the controller.

Figure 7:
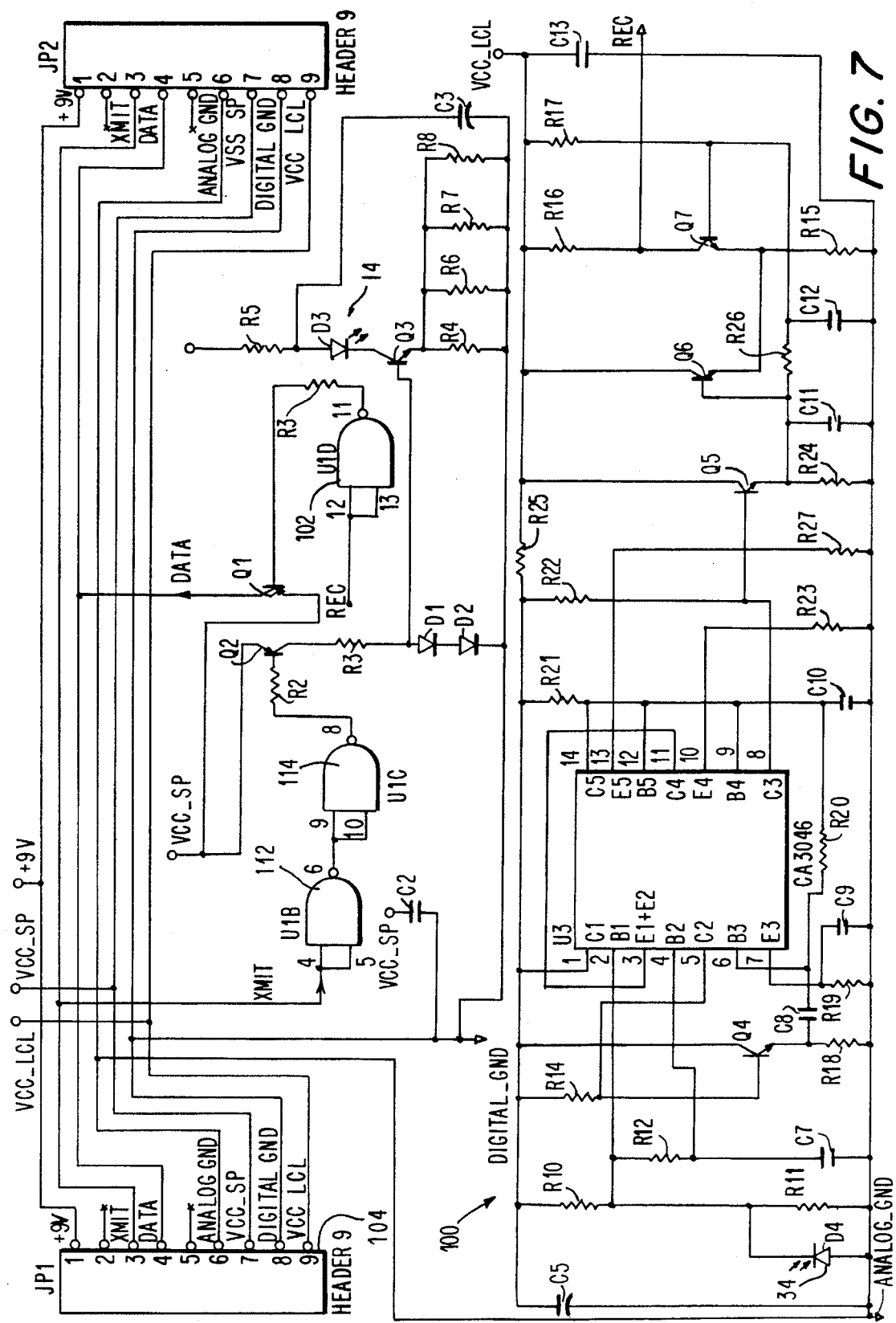
FIG. 7 is an electrical circuit schematic of the slave board component of FIG. 6.
Figure 8:
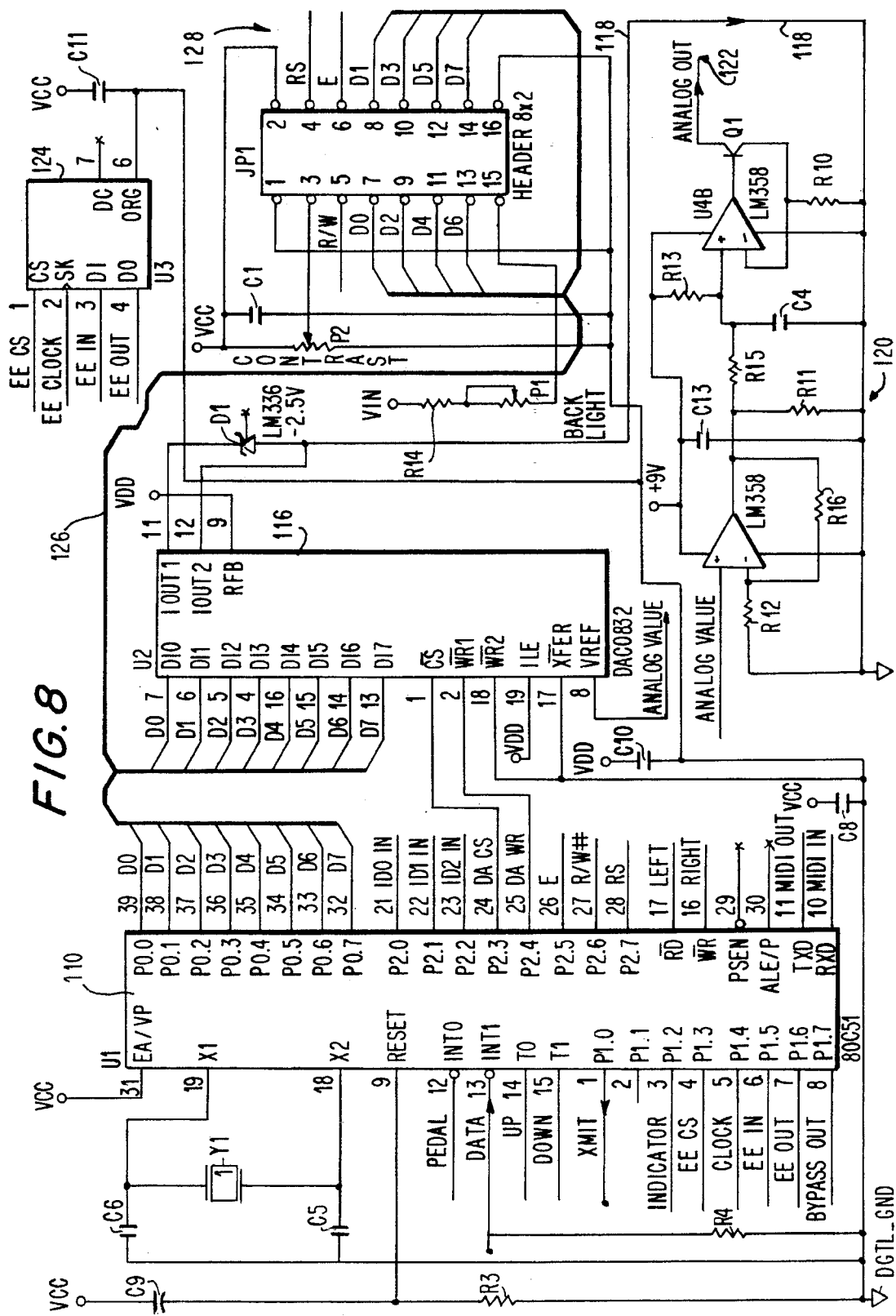
FIG. 8 is an electrical circuit schematic of the master board component of FIG. 6.
Figure 11:
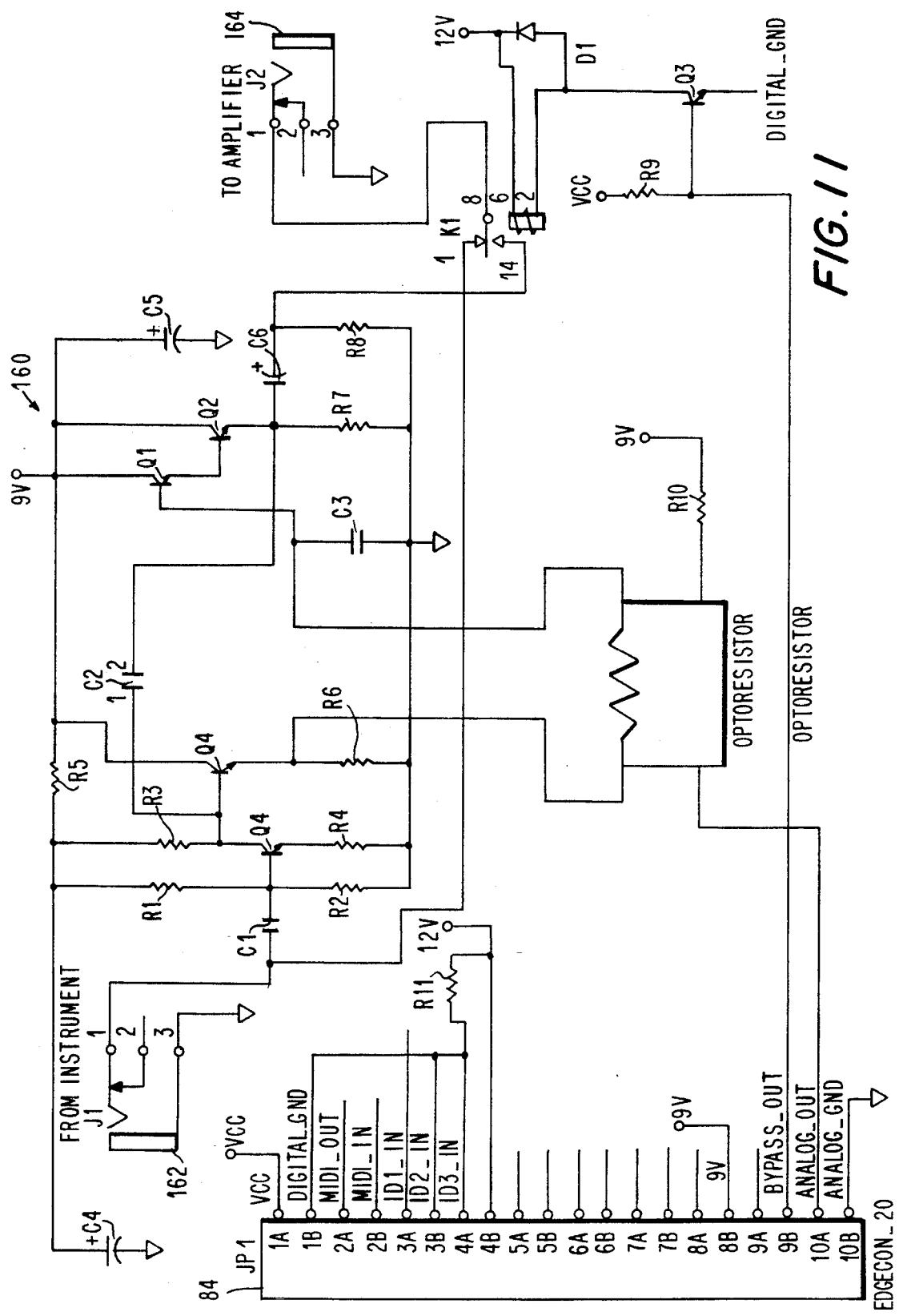
FIG. 11 is an electrical circuit schematic of another embodiment of a sound effects analog module component of FIG. 6.

FIG. 6 depicts various electrical connections among electrical circuit boards and components of the arrangement. The housing 12 contains a master control printed circuit board 70 on which the electrical circuitry depicted in FIG. 8 is mounted, as well as a slave printed circuit board 72 on which the electric circuitry depicted in FIG. 7 is mounted. The slave board 72, the display 60, the pedal 62 and the keyboard printed circuit (on which the electrical components depicted in FIG. 9 are mounted) are connected by ribbon cables 74, 76, 78, 80, respectively, to the master board 70. A sound effects module printed circuit board 82 on which either the electrical circuitry depicted in FIG. 10 or FIG. 11 is mounted, is connected to the master board 70 by a slide-in edge connector 84. The module board 82 is contained in the housing of the module 64.

As best seen in FIG. 7, the detector 34 is operatively connected through an optical receiver circuit 100 which is resistant to ambient light fluctuations. The receiver circuit 100 is of the type described and illustrated in pending U.S. patent application Ser. No. 08/297,266, filed Aug. 26, 1994. Said application is owned by the assignee of the instant invention, and the entire contents of said application are hereby incorporated by reference herein. The detector 34 generates an electrical analog signal having an amplitude proportional to the variable intensity of the reflected light impinging thereon.

As shown in FIG. 7, an output terminal (REC) is connected to an input of a buffer inverter 102 whose output is conducted over a receive line (DATA) through an electrical connector 104 and, thereupon, to an input terminal (DATA) which, in FIG. 8, is designated as pin 13 of a programmed control processor 110, preferably Model No. 80C51. The receiver circuit 100 and the processor 110 convert the analog signal of the detector 34 into a pulsed signal having a pulse width proportional to the intensity of the received light.

The processor 110 has an output terminal (XMIT) designated as pin 1 which is connected via the connector 104 (see FIG. 7) over a transmit line (XMIT) to a pair of buffer inverters 112, 114, a transistor Q2, and a bank of current drivers R4–R8 to the transmitting diode 14. The processor 110 is programmed, when energized, for pulsing the transmitting diode 14, thereby transmitting a pulsed light beam to and from the reflective strip 44 on the guitar neck 24 for reception by the receiving diode 34. In ram, the diode 34 generates an analog signal which is converted by the receiver circuit 100 and the processor 110 to a pulsed signal whose pulse width is proportional to the intensity of the received light.

The processor 10 has internal counters/timers. When the pulsed signal initially goes from a low level (logic zero) to a high level (logic one), one internal timer starts counting the pulse width in one microsecond increments, and then stops when the pulsed signal returns to the low level. The resulting measurement of the number of counts is indicative of the pulse width.

In the preferred embodiment, the transmitting diode 14 is pulsed for five microseconds every 250 microseconds. For greater measurement accuracy, and to resist noise and jitter effects, this measurement is repeated a number of times by repetitively pulsing the transmitting diode 14, by measuring the corresponding pulse widths, and then by averaging the pulse width measurements to measure the average pulse width and, in ram, the average intensity of the received light. In the preferred embodiment, the processor samples the receiving diode sixty-four times. This measurement procedure is described in detail in pending U.S. patent application Ser. No. 08/177,904, filed Jan. 6, 1994; pending Ser. No. 08/001,058, filed Jan. 6, 1993; and abandoned Ser. No. 07/776,669, filed Oct. 15, 1991. All of the aforementioned applications are owned by the assignee of the instant invention, and the entire contents of said applications are hereby incorporated by reference herein.

The sensitivity of the arrangement is adjusted as follows: With nothing in the overlapping region of the emission and sensing spaces, the intensity of the light reflected off a standard ceiling of eight foot height is assumed to be zero, and the pulse width of the measured average signal, if any, is assumed or set to correspond to zero. When something is thereupon positioned in the overlapping region, the pulse width increases from the zero value. The overlapping extends from zero (corresponding to the top wall 18 of the housing 12) to about 6 feet off the floor. The processor 110 is programmed to set a number of levels, e.g., 1000, in this six foot range. Thus, the more levels, the higher the resolution, and the greater the capability of arrangement to detect even fractional differences in elevation of the instrument relative to the floor.

Since this six foot range is too large for most applications, this invention proposes, as described below, setting an active range bounded by minimum and maximum distances relative to the floor. For example, the minimum and maximum distances can be respectively set to three feet and five feet. This three foot–five foot range is then the active zone. The processor 110 is programmed only to recognize when the instrument is located within this active zone.

Before describing the various operational modes, FIG. 8 also discloses a digital to-analog converter 116 operative for generating an analog voltage signal over line 118 to a voltage-to-current converter circuit 120 operative for converting the analog voltage signal to an analog current signal at output terminal 122.

FIG. 8 further shows an EEROM chip 124 operative for saving stored parameters, e.g., the aforementioned maximum and minimum distances of the active zone, after power shut-down. A bus 126 delivers various display driver signals from the processor 110 to a display interface circuit 128.

The processor 110 has an output terminal (INDICATOR) designated as pin 3 which is conducted to an input of indicator circuit 130 (see, FIG. 12a) operative for generating a signal to energize a bi-color LED 132 to be either red or blue depending upon a selected operational mode, as described below.

The processor 110 also has an input terminal (UP) and another input terminal (DOWN) designated as pins 14 and 15, as well as another input terminal (RIGHT) and yet another input terminal (LEFT) designated as pins 16 and 17, respectively. As shown in FIG. 12b, these input terminals are connected via a connector 134 to the keyboard 50, and via a connector 136 to the foot pedal 62. The keyboard 50 is depicted as a bank of single pole, single throw, switches in FIG. 9.

Figure 12C:
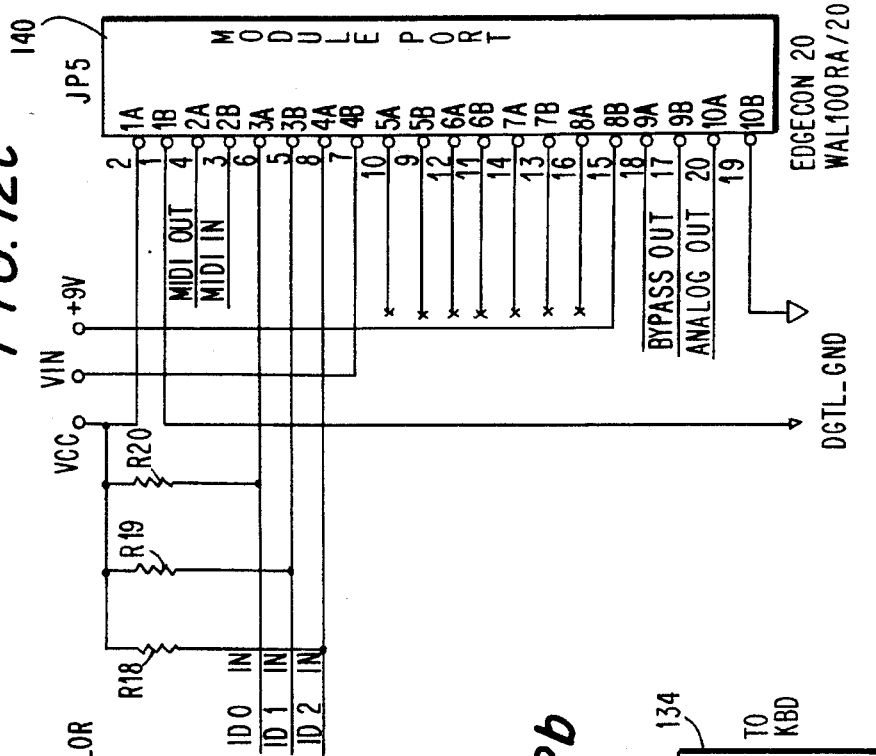
FIGS. 12a, 12b and 12c are electrical circuit schematics of an indicator drive circuit, a foot pedal/keyboard drive circuit, and a MIDI interface circuit, respectively.
Figure 12A:
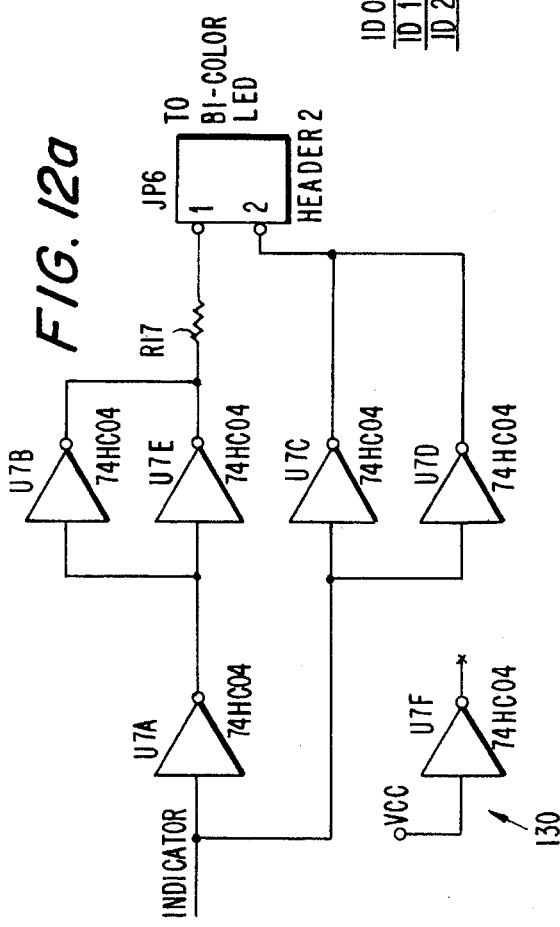
Figure 12B:
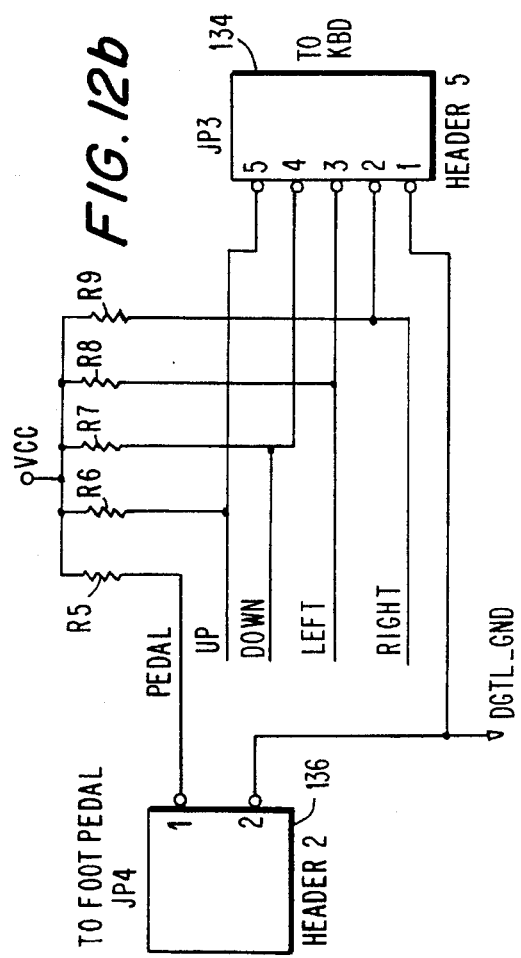

FIG. 12c depicts a module edge connector 140 on the master board. Connector 140 is adapted to mate with the edge connector 84 from the module housing 64. The output terminals (MIDI IN) and (MIDI OUT) designated as pins 10 and 11 of the processor 110 are connected to the edge connector 140. In addition, the output terminals (ID0 IN, ID1 IN and ID2 IN) designated as pins 21, 22, 23 of the processor 110 are also connected to the edge connector 140. The analog output terminal 122 of the converter circuit 120 is also connected to the edge connector 140.

As previously noted, the module 64 contains the board 82 on which either the MIDI digital circuitry 150 of FIG. 10, or the WAH analog circuitry 160 of FIG. 11, is mounted. As shown in FIG. 11, the analog circuitry 160 has an input terminal 162 connected to the audio analog signal source, e.g., via the cable 164 depicted in FIG. 1, and has an output terminal 164 connected to the amplified speaker 32, e.g., via the cable 166 depicted in FIG. 1. The analog circuitry of FIG. 11 is entirely conventional and forms no part of this invention.

As shown in FIG. 10, a MIDI instrument is connected to the audio input terminal of a MIDI-controlled sound effects unit, e.g., a harmonizer 152. The harmonizer has an audio output terminal connected to the amplified speaker 32. The harmonizer also has a control terminal, known as the MIDI IN terminal, which is connected to the MIDI OUT terminal 154 of the digital circuitry 150. The digital circuitry 150 also has a MIDI IN terminal 156 to which another MIDI unit can be connected, e.g., a synthesizer, and also has a MIDI THRU terminal 158 to which an additional MIDI unit can be connected. The digital circuitry of FIG. 10 is entirely conventional and forms no part of this invention.

Assuming that the active zone has already been established, the arrangement operates as follows: When a player 30 positions the instrument at a certain elevation in the active zone, the average pulse width is measured, and a corresponding control signal indicative of that elevation is generated. The control signal is then used to generate either a distinct MIDI command signal for controlling the harmonizer 152 and, in ram, modulate the sound output, or an analog output signal for controlling the analog circuitry 150 and, in turn, modulate the sound output. By way of non-limiting example, the MIDI command signal can change the volume, pitch or harmonic frequency characteristics of the sound output. The analog output signal can change the center frequency of the sound output. Different elevations of the instrument correspond to different sound effects.

In the preferred embodiment, there are two distinct playing modes. The first, a so-called "SWITCH" mode, is activated and deactivated by the foot pedal 62. Thus, when a player likes a certain sound effect, the player will step on the foot pedal 62 and, thereupon, the arrangement will stop generating control signals. In order to start generating such control signals again, the player must again step on the foot pedal, whereupon the arrangement will continue to generate the control signals as before.

The second mode, a so-called "MATCH" mode, is activated by the foot pedal 62, but is not deactivated by the foot pedal. Instead, in order to start generating the control signals again, the player will have to move the instrument, first out and then into the active zone, and thereupon pass the instrument through the same elevation as when the foot pedal was initially pressed. This "out, in and pass-through" practiced movement enables the arrangement to continue generating the control signals as before. Activation of each mode is indicated by one color of the indicator 132; deactivation is indicated by the other color of the indicator 132.

Figure 13:
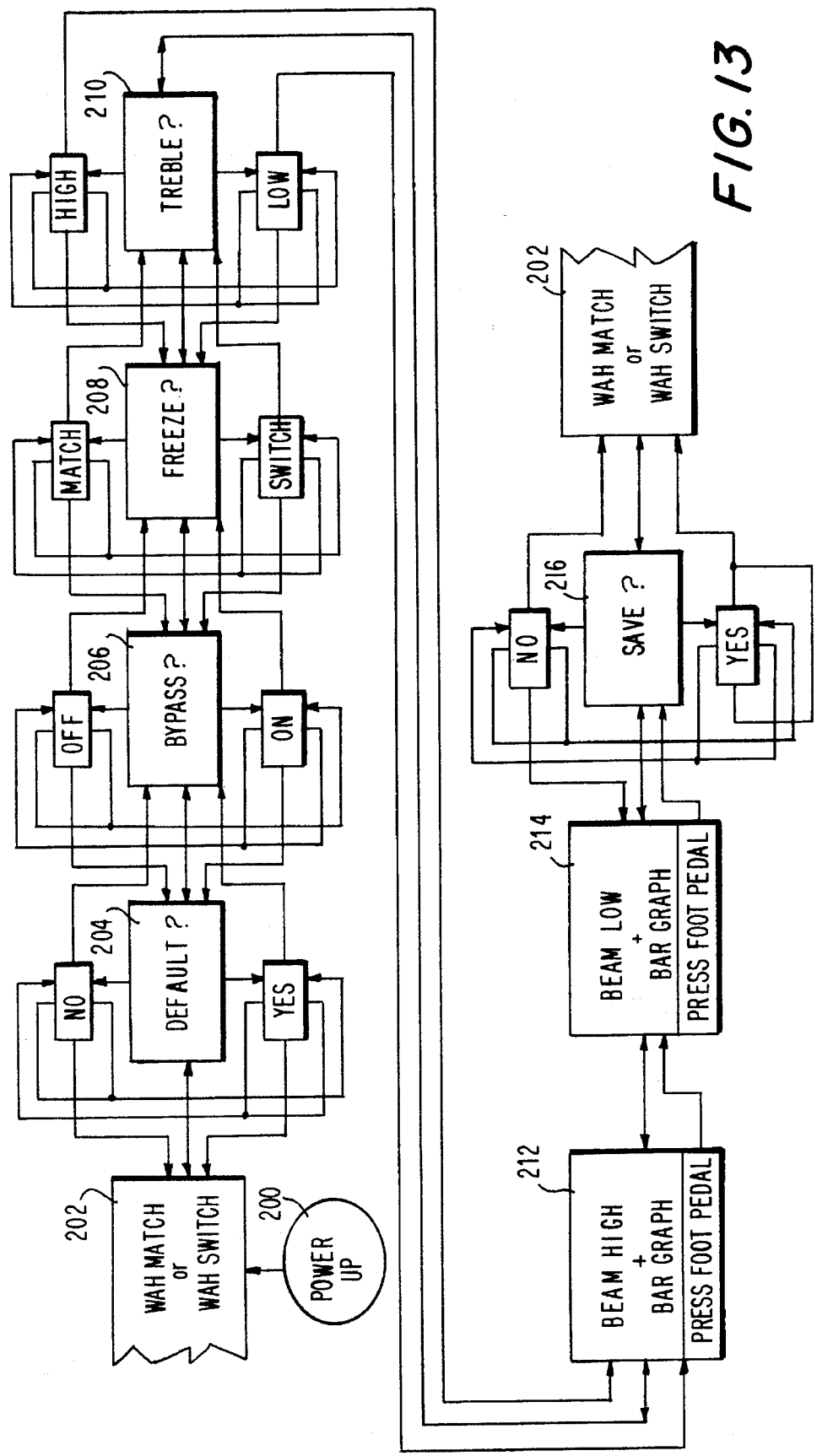
FIG. 13 is a flow chart of a set-up protocol for an analog sound effects module.
Figure 14:
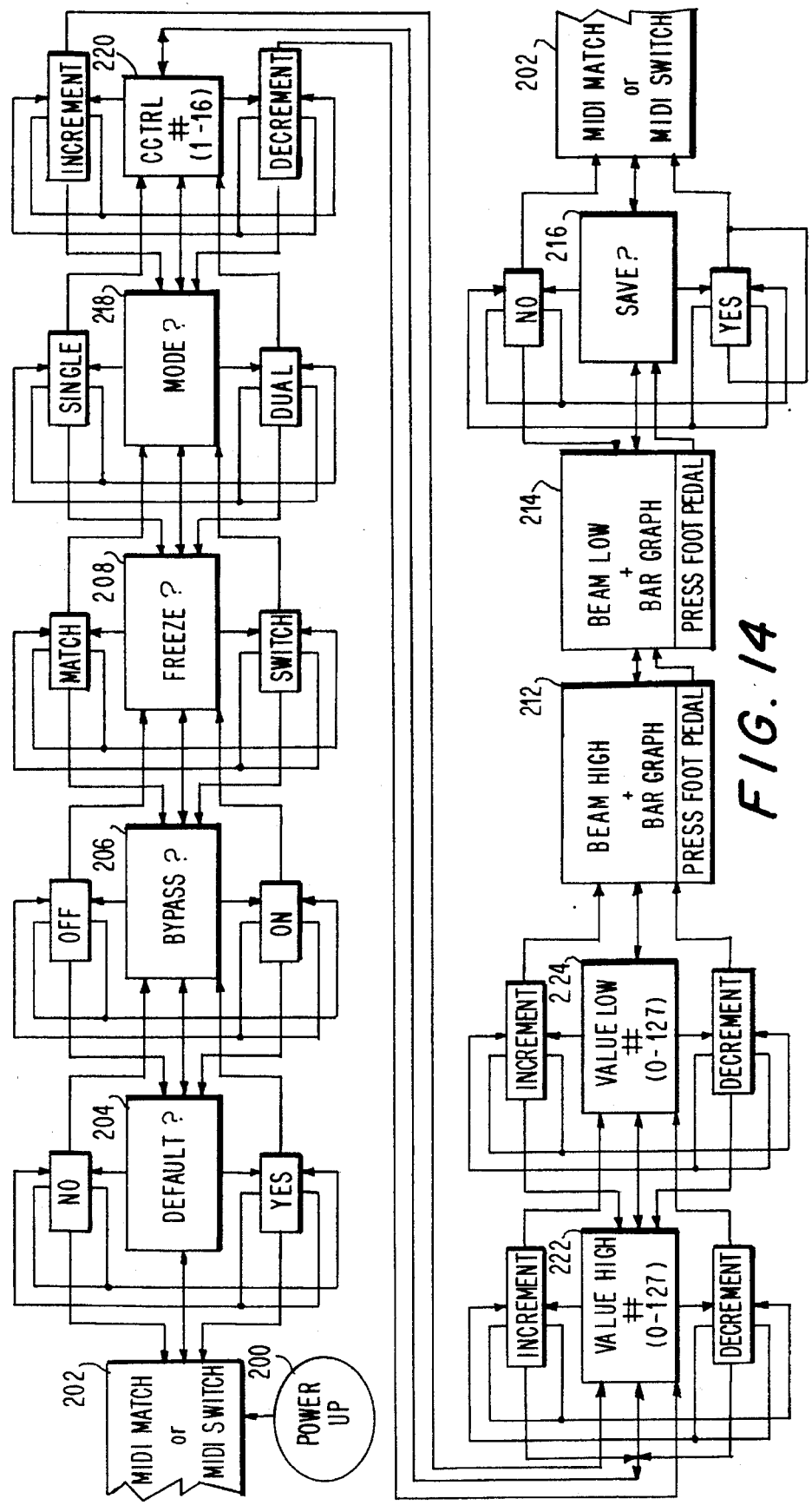
FIG. 14 is a flow chart of a set-up protocol for digital sound effects module.

FIGS. 13 and 14 are flow charts depicting the initial set up protocols for the WAH and MIDI modules. Turning first to FIG. 13, upon power-up 200, the EEROM 124 advises the arrangement at block 202 whether the last playing mode was the match or switch mode, and sets the processor 110 accordingly. Thereupon, the processor prompts the player 30 to make certain selections by placing sequential menus on the display 60. The player accesses the menus by stepping on the right or lea keys of the keyboard 50, and indicates his or her selection by stepping on the up or down keys of the keyboard.

The menus include a default menu 204. By choosing "YES," the player selects the factory default settings. By choosing "NO," the player selects the previously stored settings.

The next menu is the bypass menu 206. By choosing "ON," the arrangement does not output anything when the instrument is not in the active zone. By selecting "OFF," the arrangement outputs the lowest value when the player is not in the active zone.

The next menu is the freeze menu 208. By selecting "MATCH", the aforementioned match mode is selected. By selecting "SWITCH", the aforementioned switch mode is selected. The indicator 132 visually indicates the selected mode.

The next menu is the "TREBLE" menu 210. By selecting "HIGH," the direction of increasing treble is set from a higher elevation to a lower elevation. By selecting "LOW," the direction of increasing treble is selected for a lower elevation to a higher elevation. In other words, moving the instrument neck 24 either upward or downward generates opposite treble effects.

The next menu is the "BEAM HIGH" menu 212 followed by the "BEAM LOW" menu 214. These menus set the maximum and minimum distances of the active zone. Thus, the player in the "BEAM HIGH" menu positions the neck of the instrument at a desired maximum height, and thereupon steps on the foot pedal 62 to set the desired maximum distance. Thereupon, the player moves the instrument to the desired minimum height and again steps on the foot pedal 62 to set the minimum distance of the active range. Ideally, the active zone may be from two to three feet, the actual settings being dependent on the height of the player 30.

The next menu is the save menu 216. By choosing "NO," the aforementioned settings are not saved. By choosing "YES," the aforementioned settings are saved in the EEROM 124.

Once the set-up protocols have been completed, the arrangement enters either the match or the switch mode as indicated at block 202.

The flow chart of FIG. 14 contains many of the same menus as those previously described in connection with FIG. 13 and, hence, those like menus are identified by the identical numerals and their operation will not be repeated for the sake of brevity. In the case of a MIDI module, there are four additional menus, namely the mode menu 218, the control channel menu 220, the MIDI value high menu 222 and the MIDI value low menu 224.

The mode menu 218 alternates between a "single" and a "dual" setting. The single setting advises the arrangement to output a single control signal on one channel. The "dual" setting advises the arrangement to output two control signals on two channels. The dual setting is used in connection with the arrangement depicted in FIG. 15.

The channel control menu 220 allows the player to increment or decrement the selected channel which advantageously numbers from one through sixteen channels. Different MIDI units have different control channels and, hence, any particular arrangement has to be configured to the channel of the particular instruments being used.

The MIDI value high menu 222 and the MIDI value low menu 224 sets the MIDI output control signal associated with the maximum and minimum distances, respectively. Such values typically range anywhere from zero to 127 units. Sometimes, MIDI units can only accept MIDI values within a certain range.

Figure 15:
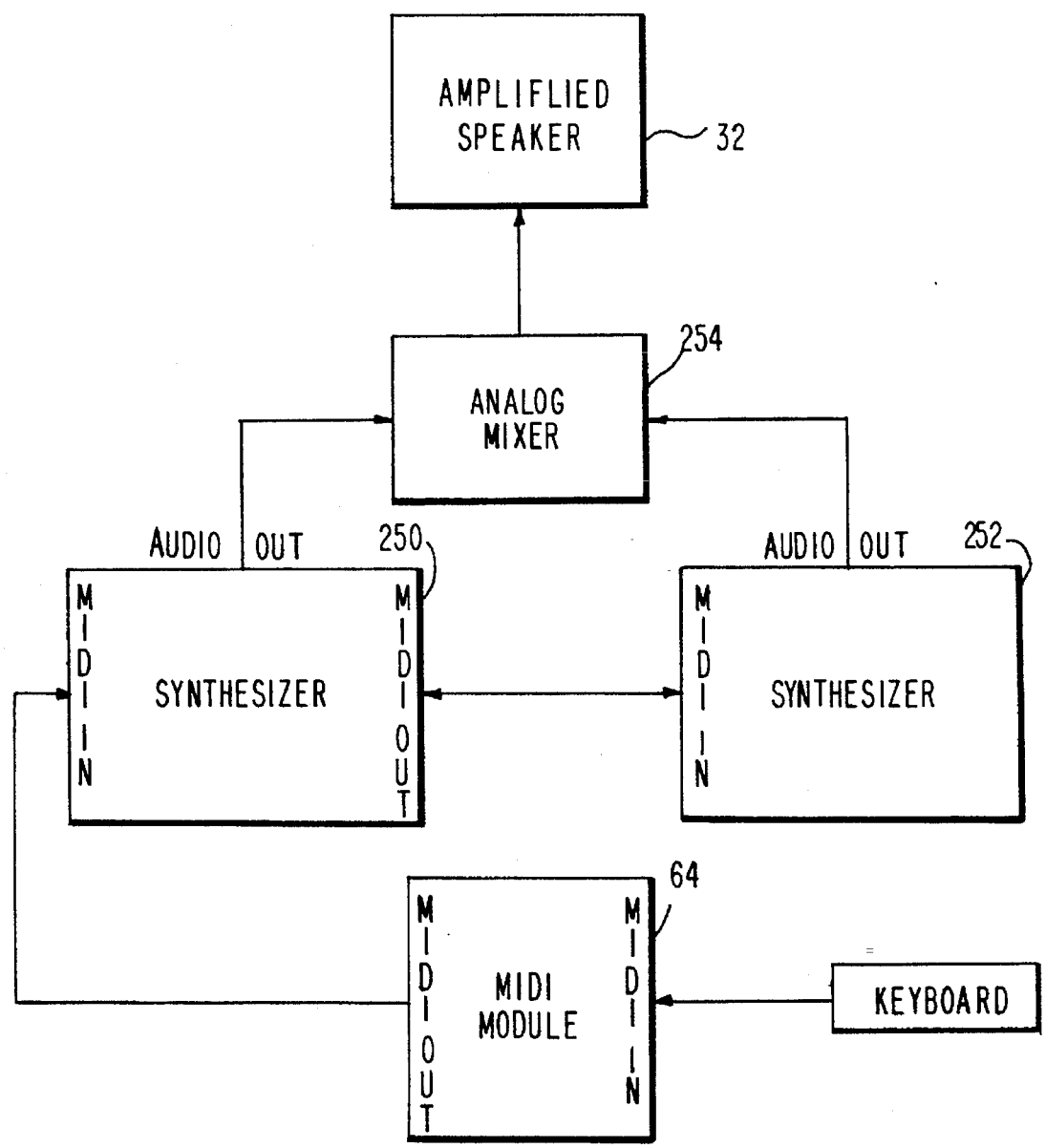
FIG. 15 is a block diagram of an instrument hook-up in accordance with another embodiment of this invention.

The aforementioned "DUAL" setting of mode menu 218 is advantageously employed when the arrangement is used as depicted in FIG. 15. A MIDI sound-generating unit, e.g., a keyboard, is connected to the MIDI IN terminal of the MIDI module 64 containing the MIDI circuitry 150 depicted in FIG. 10. The MIDI OUT terminal of the module 64 is connected to the MIDI IN of a first synthesizer 250. The MIDI THRU terminal of the synthesizer 250 is, in turn, connected to the MIDI IN terminal of a second synthesizer 252. The audio outputs of both synthesizers 250, 252 are, in turn, both connected to an analog mixer 254 and, in turn, to an amplified speaker 32.

In operation, the MIDI module 64 controls both synthesizers at the same time. In the preferred embodiment, the balance between the two synthesizers is controlled. For example, the volume of synthesizer 250 may increase, while the volume of synthesizer 252 decreases, and vice versa.

This invention is not intended to be limited to the illustrated guitar, but instead, is broadly applicable to any hand-held, portable, sound-generating instrument that is movable in space.

It will be understood that each of the elements described above, or two or more together, also may find a useful application in other types of constructions differing from the types described above.

While the invention has been illustrated and described as embodied in a musical sound effects controller, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An arrangement for generating modulated sound, comprising:
   a) a support;
   b) means supported by the support, for transmitting radiation therefrom into an emission space;
   c) means for generating sound, including an inanimate sound-generating instrument movable relative to, and at a distance from, the support within the emission space, to direct radiation toward the support with a variable intensity proportional to the distance of the instrument relative to the support;
   d) means supported by the support, for sensing the radiation directed by the instrument, and for generating a control signal indicative of said radiation intensity; and
   e) control means operatively connected to the sensing means and the sound generating means, for modulating the sound with the control signal to generate a modulated sound.

2. The arrangement according to claim 1, wherein the transmitting means includes an emitter for emitting a light beam, and wherein the sensing means includes a detector for detecting light.

3. The arrangement according to claim 2; and further comprising reflector means supported by the instrument for joint movement therewith, and operative for reflecting the light beam toward the detector.

4. The arrangement according to claim 3, wherein the reflector means is a retro-reflector mounted on the instrument.

5. The arrangement according to claim 4, wherein the instrument has an elongated portion, and wherein the retro-reflector is an elongated strip adhered along the instrument portion in a position facing the support.

6. The arrangement according to claim 1, wherein at least one of the transmitting means and the sensing means includes means for shaping at least one of the spaces to have a non-circular cross-section.

7. The arrangement according to claim 1, wherein the control means includes means for setting minimum and maximum distances at which the instrument is spaced from the support, and for modulating the sound only when the instrument is located between said minimum and maximum distances.

8. The arrangement according to claim 7, wherein the setting means includes foot-operated switches on the support.

9. The arrangement according to claim 7; and further comprising display means on the support for displaying information indicative of said minimum and maximum distances.

10. The arrangement according to claim 7, wherein the control means includes means for establishing a multitude of levels between said minimum and maximum distances, for associating the control signal with one of said levels, and for generating a modulated sound corresponding to said one level; and wherein the control means generates a different modulated sound for each level.

11. The arrangement according to claim 7, wherein the control means includes means for recognizing different directions of movement of the instrument, and for differently modulating the sound upon such direction recognition.

12. The arrangement according to claim 1, wherein the control means includes separate modules, each removably and selectively connected to the support for differently modulating the sound upon such module connection.

13. A method of generating modulated sound, comprising the steps of:
   a) transmitting radiation from a support into an emission space;
   b) generating sound, including moving an inanimate sound-generating instrument relative to, and at a distance from, the support within the emission space, to direct radiation toward the support with a variable intensity proportional to the distance of the instrument relative to the support;

c) sensing the radiation directed by the instrument, and generating a control signal indicative of said radiation intensity; and d) modulating the sound with the control signal to generate a modulated sound.

14. The method according to claim 13, wherein the transmitting step is performed by emitting a light beam, and wherein the sensing step is performed by detecting light.

15. The method according to claim 14; and further comprising the step of reflecting the light beam toward the support by mounting a reflector on the instrument.

16. The method according to claim 13, wherein at least one of the transmitting and the sensing steps is performed by shaping at least one of the spaces to have a non-circular cross-section.

17. The method according to claim 13, wherein the modulating step is performed by setting minimum and maximum distances at which the instrument is spaced from the support, and by modulating the sound only when the instrument is located between said minimum and maximum distances.

18. The method according to claim 17, wherein the modulating step is performed by establishing a multitude of levels between said minimum and maximum distances by associating the control signal with one of said levels, and by generating a modulated sound corresponding to said one level; and generating a different modulated sound for each level.

19. The method according to claim 17, wherein the modulating step is performed by recognizing different directions of movement of the instrument, and by differently modulating the sound upon such direction recognition.

20. The method according to claim 13, wherein the modulating step is performed by removably and selectively connecting separate modules to the support for differently modulating the sound upon such module connection.

* * * * *